Nov. 16, 1937.   L. J. KEPLER   2,099,304
COMPENSATING WHEEL MOUNTING
Filed Sept. 17, 1936   2 Sheets-Sheet 1
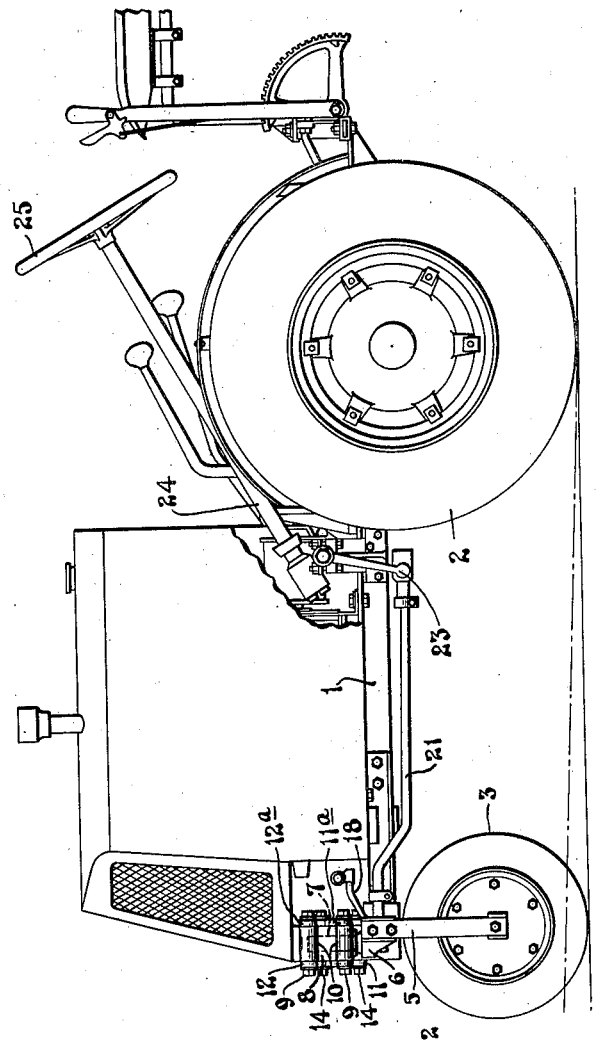
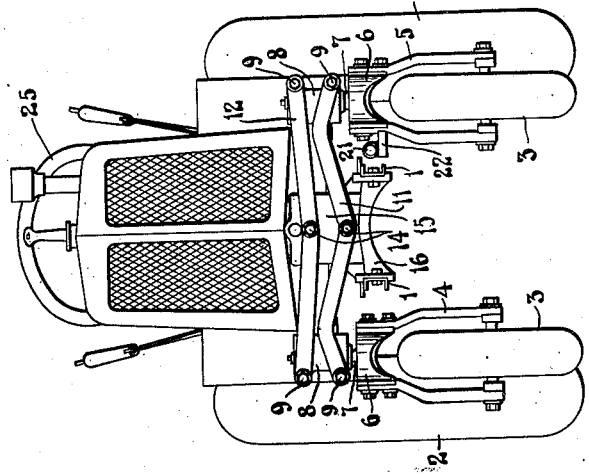
INVENTOR.
Lionel J. Kepler
BY Bohleber & Ledbetter
ATTORNEYS.

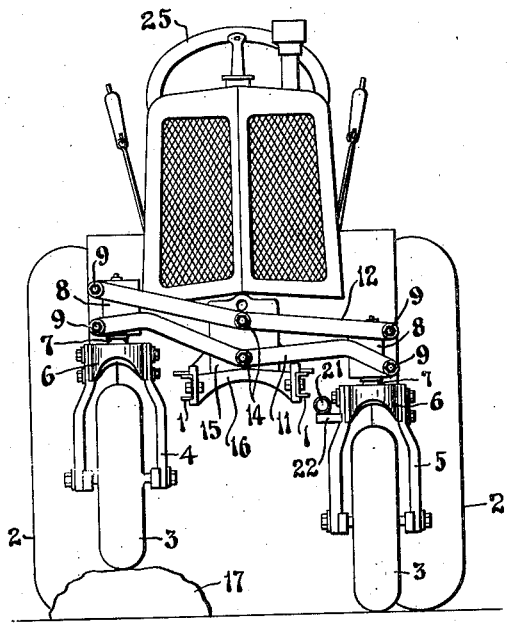
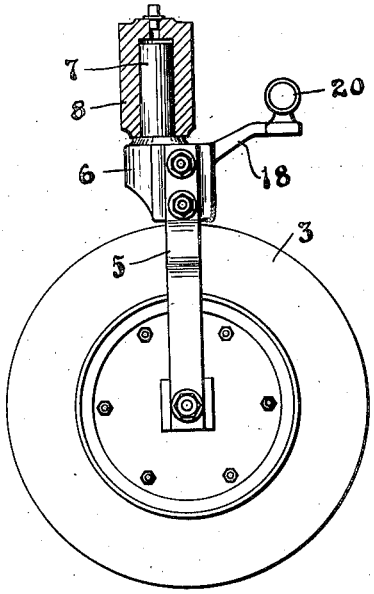
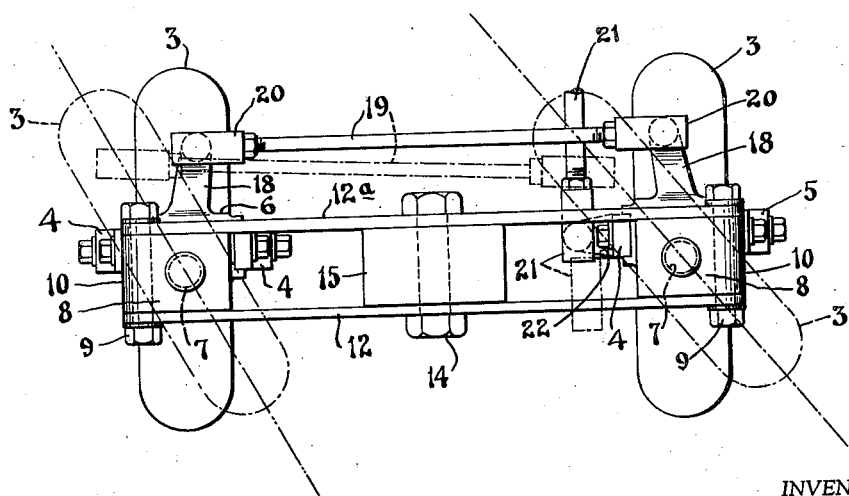

Patented Nov. 16, 1937

2,099,304

UNITED STATES PATENT OFFICE 2,099,304

COMPENSATING WHEEL MOUNTING

Lionel J. Kepler, Dayton, Ohio

Application September 17, 1936, Serial No. 101,239

8 Claims. (Cl. 280—95)

This invention relates to a wheel mounting for vehicles and particularly to the front wheel mounting for motor driven tractors and a steering gear therefor, and still more particularly to tractors designed for use in hauling trailers or cultivators over rough terrain, such for instance as farm land.

In the use of tractors for this and similar purposes it is desirable to mount the front wheels thereof so as to be capable of greater vertical movement relative to the frame of the chassis than is usual in vehicles for other uses owing to the unevenness of the ground or obstacles in the path of travel, and for this reason front wheels of tractors have been mounted on centrally pivoted axles. This mode of mounting, however, is objectionable for the reason that the rise of one wheel in going over an obstruction, or its drop into a depression, causes the wheel which happens to be tracking on the lower level to assume an angle or rake which, with the shift in the centre of gravity, causes the tractor to become top-heavy and liable to overturn.

To overcome this difficulty the wheel span or gauge was widened, or, as has also been proposed, the front wheels were mounted on a pair of axle bars coupled by steering knuckles, and which, when tilted on centrally aligned pivots would move in parallelism and support the wheels in the normal vertical plane while rising or falling. These expedients while serving the purpose of guarding against overturn of the tractor presented other objections.

The wider gauge increased the steering radius and rendered the tractor inefficient for many uses, particularly for use on small areas. The increased gauge, or even the usual gauge, is impracticable for use in tilling farm land, especially when it is desired that the device track in adjacent furrows of a plowed field or between the rows of various crops. The low underslung axle and steering knuckles make steering difficult on rough ground and in and out of furrows, and the low axle, and especially the double parallel axles, interfere with the hilling and growing plants when operating a cultivator.

The object of my invention is to overcome these objections by providing a construction which will permit narrow gauge traction, and afford a much higher clearance between the wheels and between the ground and chassis frame and even a wider clearance between the wheels than would be possible with narrow gauge tractors having the usual wheel suspension, and also permit the use of a shorter steering radius, thereby making the tractor suitable not only for work on small areas, but making it especially adaptable for farm work.

A further object of my invention is to provide a narrow tractor of the class described in which the front wheels thereof are mounted to run respectively in adjacent furrows of a plowed field and in which the mounting means for the wheels is such as to permit the tractor to straddle with suitable clearance a row of growing crops and leave sufficient space beneath the chassis to enable one to use the tractor in the cultivation of said crops for a longer portion of their growing period than has heretofore been possible with tractors of comparable size now on the market.

A further object is to provide means for accomplishing the foregoing objects without the necessity for redesigning the tractor as a whole and permit adaptation of a high clearance front running gear to existing types of tractors.

My invention is illustrated in the accompanying drawings, in which

Figure 1 is a front elevation of a tractor embodying my invention.

Figure 2 is a side elevation of the tractor shown in Figure 1.

Figure 3 is a front elevation showing the action of the front wheels in passing over an obstruction.

Figure 4 is an enlarged side elevation of one of the steering wheels illustrating its pivotal connection with the front wheel suspension mechanism.

Figure 5 is an enlarged top view showing the front wheel suspension and steering gear connections.

I shall now describe my invention by referring to the drawings, and more particularly to Figure 2, wherein is illustrated a tractor having the usual chassis comprising longitudinal channel beams 1, rear driving wheels 2, front steering wheels 3, and the usual engine with its housing, control levers and steering wheel mechanisms. Instead of the usual underslung front axle and steering knuckles having stub axles on which the wheels are journalled, I provide a pair of swivelled yokes 4 and 5 in which wheels 3 are journalled in any suitable manner. These yokes have heads 6 provided with vertically projecting pivots 7 which are journalled in wheel suspension blocks 8.

These blocks 8 are hinged to a pair of levers, and preferably between two pairs of levers 11, 12 and 11a, 12a, by bolts 9 journalled in bosses 10 extending across the outer faces of the blocks. The axial centers of these bolts are in vertical alignment, and disposed normal to and equidistant from the axial centers of the yoke pivots. The levers, between which blocks 8 are hinged, are arranged in two pairs, a front pair 11 and 12, and a rear pair 11a and 12a; the blocks 8 being held against rotation by the levers and bolts 9, which in turn, hold the levers of each pair in parallel relation, with each pair in parallelism both horizontally and vertically. The levers are centrally pivoted on vertically aligned bolts 14 passing through a pivot block 15 secured upon, or forming part of a saddle 16 which is bolted between the forward ends of the frame members 1, and thus forms part of the main frame of the tractor chassis. The lower levers of each pair are given an upward bend near the pivotal connection with blocks 8 to provide clearance over the corners of yoke heads 6 when the levers are tilted, and to provide ample clearance for steering as seen in Figures 1 and 3. As shown in Figures 3 and 5 it will be seen that each pair of levers is free to swing in vertical planes on bolts 14 as either front wheel 3 is caused to rise, as when travel over a mound or rock 17, without tilting the tractor. The rise of either wheel causes the levers to rock in parallelism on either the right or left wheel suspension block, and through the pivotal connection of the levers with pivot block 15 this parallel movement of the levers will lift the front end of the tractor bodily, without tilting the same, as will be seen by a comparison of Figures 1 and 3. During this movement, assuming the rear wheels are tracking level ground, the rear end of the tractor will not tilt or rise, and the forward end will rise only to the extent indicated by the dotted line in Figure 2, that is, one-half the rise of wheel 3 in passing over the obstruction. This same relative action will occur if one wheel 3 drops into a depression, in which case, the forward end of the tractor will be lowered one-half the depth of the depression. It will be observed that during such relative vertical movements of the front wheels the tendency of the front wheels to turn on their pivots when striking an obstruction is greatly reduced owing to the pivots being directly over the peripheral centers of the wheels and forward of the axial centers, and thus relieving strain on the steering gear.

The steering gear comprises arms 18, see Figures 4 and 5, which are rigidly connected with the yoke heads 6 and project rearwardly therefrom at an upward angle to clear the chassis frame. The ends of a tie rod 19, extending across the chassis above the frame, are coupled to the steering arms 18 by universal joints 20. A drag link 21, having at its forward end a universal joint connection with an arm 22, see Figures 1 and 3, which projects laterally from the head of yoke 5 is provided for operating yokes 4 and 5 through the tie-rod 19. The rear end of link 21 has a universal joint connection with a lever 23 which is actuated through the usual geared connection by a steering post 24 and steering wheel 25. It will be seen by reference to Figures 4 and 5 that the fore and aft movement of link 21 will cause yoke 5 to turn on its vertical pivot 7 and through steering arms 18 and tie rod 19 cause the yoke 4 to rotate on its vertical pivot in the same direction. It will be noted that by reason of the vertical yoke pivots 7 being directly over the peripheral centers of the wheels and slightly forward of the axial centers, this turning movement of the yokes in steering may be done with a minimum of effort in operating the steering wheel 25, and that a very short turning radius is obtained. This "caster-wheel" mounting also causes the wheels to "track" when travelling in a normal direction without the necessity of holding them to the track by the steering mechanism, and affords shockless steering and minimum strain on the steering mechanism. It will also be noted that with my improved construction I am enabled to set the steering arms 18 at the correct inward angle to impart to the steering wheels the proper angle for the inside and outside turning arcs, and to combine the steering mechanism with the steering wheel suspension without complicating the steering connections and permit placement of all steering connections at a height entirely clear of any obstructions in the path of travel.

It will be noted by reference to Figures 1 and 3 that by dispensing with the usual underslung front axle, and mounting the front wheels in yokes having vertical steering pivots above the wheels, a maximum clearance is obtained laterally between the wheels and vertically between the ground and chassis frame thereby enabling the tractor to travel in furrows without dragging over or breaking down the tops of growing plants. It will also be noted that by the arrangement of levers above the chassis frame and the vertically positioned yokes having their pivots over the axial centers of the wheels, the load-supporting points are likewise over the axial centers and above the peripheries of the wheels.

While I have described what now appears to be a preferred form of a device embodying my invention, various modifications in the configuration of the component elements which in combination make up the invention as a whole may occur to those skilled in the art and no specific limitation is intended by the phraseology of the foregoing description or illustrations in the accompanying drawings.

What is claimed is:

1. A motor vehicle comprising, in combination, a chassis frame, a pair of levers pivoted to said frame and having vertically aligned pivots, a pair of wheel suspension blocks hinged respectively to the ends of said levers on vertically aligned pivots whereby said levers are adapted to move in parallelism in a substantially vertical plane, and a yoke suspended from the underside of each of said wheel suspension blocks at points inwardly from the ends of said pair of levers, said yokes having arms projecting downwardly and straddling a wheel journalled between said arms whereby the load supporting point of the vehicle is located above the axial center and above the periphery of the wheel.

2. In a narrow gauge tractor, the combination with a chassis frame, of a pair of levers pivoted midway between the ends thereof to said frame for movement in a substantially vertical plane, vertically disposed wheel suspension blocks hinged to the ends of said levers whereby said levers and blocks are caused to move in parallelism, a yoke vertically journalled in at points inwardly from the ends of said pair of levers, each of said yokes of said wheel suspension blocks each having arms projecting downwardly and straddling a wheel journalled between said arms, and mechanism above said chassis frame adapted simultaneously to turn said yokes in their respective journals.

3. In a narrow gauge tractor, the combination with a chassis frame, of a pair of levers pivoted midway between the ends thereof to said frame for movement in a substantially vertical plane, vertically disposed wheel suspension blocks hinged to the ends of said levers whereby said levers and blocks are caused to move in parallelism, a pair of yokes each having arms projecting downwardly and straddling a wheel journalled between said arms, a vertical journal projecting upward from each of said yokes and having a bearing in said suspension blocks in advance of the axial centers of said wheels and inwardly from the ends of said pair of levers, and mechanism connected to said yokes and disposed above said chassis frame adapted simultaneously to turn said yokes in their respective bearings.

4. In a motor vehicle, the combination with the chassis frame, of a pivot block mounted on the upper side of said frame, a pair of levers pivoted on said block above the frame and having vertically aligned pivots, wheel suspension blocks hinged to the ends of said levers on vertically aligned pivots whereby said levers are caused to move in parallelism, and a yoke suspended from the underside of each of said wheel suspension blocks at a point inwardly from the ends of said pair of levers, said yokes having arms projecting downwardly and straddling a wheel journalled between said arms whereby a load supporting point of said vehicle is located above the axial center and above the periphery of the wheel.

5. In a motor vehicle, the combination with the chassis frame, of a pivot block mounted thereon, two pairs of levers pivoted on said block above the frame, the levers of each pair being centrally pivoted on vertically aligned pivots, wheel suspension blocks hinged respectively between the ends of said pairs of levers on vertically aligned pivots whereby said levers are caused to move in horizontal and vertical parallelism, and a yoke suspended from the underside of each of said wheel suspension blocks at a point inwardly from the ends of said pairs of levers, said yokes having arms projecting downwardly and straddling a wheel journalled between said arms and whereby a load supporting point of said vehicle is located above the axial center and above the periphery of the wheel.

6. In a motor vehicle, the combination with the chassis frame, of a pivot block mounted thereon, a pair of levers pivoted on said block above the frame and having vertically aligned pivots, wheel suspension blocks hinged to the ends of said levers on vertically aligned pivots whereby said levers are caused to move in parallelism, a wheel yoke swivelled in each of said suspension blocks on a vertical pivot located inwardly from the ends of said levers, whereby a load supporting point of said vehicle is located above the axial center and above the periphery of the wheel, steering arms projecting from said yokes above the wheel peripheries and coupled together by a tie rod extending over the chassis frame, and a drag link coupled to one of said yokes.

7. A motor vehicle having in combination a chassis frame, a pair of levers pivoted to said frame and having vertically aligned pivots, a pair of wheel suspension blocks hinged respectively to the ends of said levers on vertically aligned pivots whereby said levers are adapted to move in parallelism in a substantially vertical plane, a yoke suspended from the underside of each of said wheel suspension blocks at a point inwardly from the ends of said levers, said yokes having arms projecting downwardly and straddling a wheel journalled between said arms whereby the load supporting point of the vehicle is located above the axial center and above the periphery of the wheel, a steering arm projecting from each yoke, a tie rod connecting said arms and lying in a plane above the chassis frame, and a steering lever and operating means connected with one of said yokes.

8. In a motor vehicle, the combination with the chassis frame, of a pivot block mounted thereon, a pair of levers pivoted on said block above the frame and having vertically aligned pivots, wheel suspension blocks hinged to the ends of said levers on vertically aligned pivots whereby said levers are caused to move in parallelism, a wheel yoke swivelled in each of said suspension blocks on a vertical pivot located inwardly from the ends of said levers, whereby a load supporting point of said vehicle is located in advance of the axial center and above the periphery of the wheel, steering arms projecting at an inward and upward angle from each yoke and coupled together by a tie rod extending over the chassis frame, and a drag link coupled to one of said yokes.

LIONEL J. KEPLER.

CERTIFICATE OF CORRECTION.

Patent No. 2,099,304.                                         November 16, 1937.

LIONEL J. KEPLER.

It is hereby certified that error appears in the printed specification of the above numbered patent requiring correction as follows: Page 2, second column, lines 63, 64 and 65, claim 2, for the words "at points inwardly from the ends of said pair of levers, each of said yokes of said wheel suspension blocks each having" read each of said wheel suspension blocks at points inwardly from the ends of said pair of levers, each of said yokes having; and that the said Letters Patent should be read with this correction therein that the same may conform to the record of the case in the Patent Office.

Signed and sealed this 18th day of January, A. D. 1938.

Henry Van Arsdale,
Acting Commissioner of Patents.

(Seal)